(No Model.)

W. H. BROWN.
JOINT FOR CYLINDERS OR CYLINDRICAL VESSELS.

No. 333,726. Patented Jan. 5, 1886.

Witnesses:
O. Sundgren
Matthew Pollock

Inventor.
William Henry Brown
by his attorneys
Brown & Hall

UNITED STATES PATENT OFFICE.

WILLIAM HENRY BROWN, OF NEW YORK, N. Y., ASSIGNOR TO BROWN'S SEAMLESS METAL COMPANY, OF JERSEY CITY, NEW JERSEY.

JOINT FOR CYLINDERS OR CYLINDRICAL VESSELS.

SPECIFICATION forming part of Letters Patent No. 333,726, dated January 5, 1886.

Application filed May 27, 1885. Serial No. 166,889. (No model.)

*To all whom it may concern:*

Be it known that I, WILLIAM HENRY BROWN, of the city and county of New York, in the State of New York, have invented a new and useful Improvement in Joints for Cylinders or Cylindric Vessels, of which the following is a specification.

The object of my invention is to provide a new and secure joint, whereby two cylinders or tubes which are produced seamless from sheet or plate metal, or two cylindric sections each having a head formed integral therewith by drawing, may be joined together.

This invention, though useful in joining together tubes or cylinders for various purposes, is particularly applicable to the manufacture of kitchen-boilers composed of two cylindric shells, each having a head formed integral therewith by drawing.

In making this joint I first form at the end of one cylindric section an internal screw-thread, and immediately behind the thread a circular recess or outward indentation, and I form on the other cylindric section, and at a short distance behind its end, a similar external screw-thread, so that when one section is screwed into the other the inner end portion of the male or entering section will extend past and lap over the circular indentation in the female cylindric section. In this circular indentation is formed an opening or hole extending from the outside of the cylinder, and after the two cylinders are connected by screwing one into the other, melted solder is poured in through the hole or opening to fill the circular indentation and aid in forming a secure union between the two sections. I preferably tin the exterior of the male cylinder and the interior of the female cylinder at the points where they are secured together, or cover such contact-surfaces with fusible metal or alloy, and after the cylinders are connected, by screwing one into the other, the joint is subjected to heat, so as to sweat them together throughout the extent of their contact-surfaces, and the solder is afterward poured into the circular indentation to add to the strength and security of the joint.

The joint as above described may be complete, or for further security I may apply to the exterior of the larger cylindric sections, at a point where the other cylindric section enters it, a metal band which will lap onto the two sections at the joint, and is sweat-soldered thereto.

Figure 1:
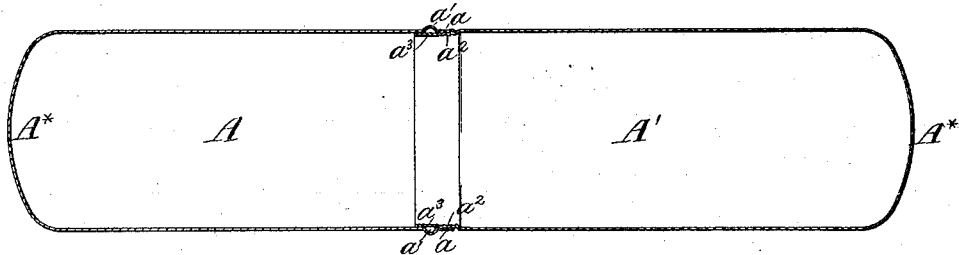
Figure 2:
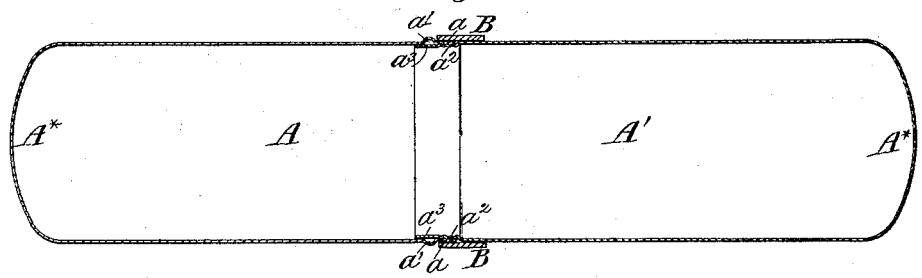
Figure 3:
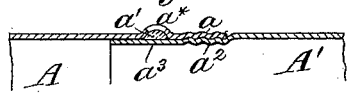
Figure 4:
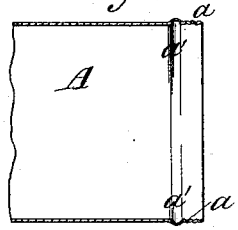
Figure 5:
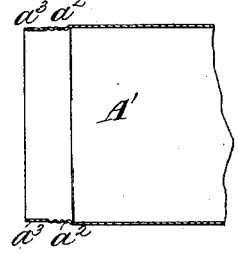

In the accompanying drawings, Figure 1 is a longitudinal section of a kitchen-boiler embodying my invention, the joint being destitute of the exterior band. Fig. 2 is a similar view of a boiler in which an exterior band is applied to the joint. Fig. 3 represents the joint upon a larger scale without the exterior band; and Figs. 4 and 5 show, respectively, the end portions of the female and male cylinders which are to be connected together, the two cylinders being constructed ready to be joined by inserting one into the other.

Similar letters of reference designate corresponding parts in all the figures.

A A' designate the two cylindric sections which are to be joined together. As here represented, each of these sections has formed integral with it a head, $A^*$, and they are or may be of about equal length, the joint being about midway of the length of the boiler.

To prepare the sections A A' for joining together, I form upon the end portion of the section A an internal screw-thread, $a$, and immediately behind the internal screw-thread is a circular or peripheral indentation, $a'$, the metal being expanded outward in a lathe or otherwise to form the circular indentation or channel within it. Upon the male section A' is formed near its end an external screw-thread, $a^2$, and beyond that screw-thread, and at the extreme end of the section, is a straight or plain portion, $a^3$, which may be cylindric or slightly taper. These screw-threads may be spun or indented into the metal without removing any of its substance. The two parts being thus constructed it will be readily understood that the male section A' may be screwed into the female section A, and that when they are coupled together in such manner the cylindric or slightly-tapered and smooth portion $a^3$ of the male section will extend past and cover the circular indentation $a'$ of the female section, as is shown in Figs. 1 and 2, and also in Fig. 3.

Before the two cylindric sections A A' are joined together I preferably tin the exterior of the threaded portion of the section A' and the threaded interior of the section A; or I cover or coat those surfaces with fusible metal or alloy, and after the sections are connected by screwing one into the other the joint is heated to fuse the metal or alloy and to produce a firm union of the two cylindric sections by sweat-soldering. In the circular indentation $a'$ is formed an opening or hole, $a^*$, leading to the exterior of the section, and after the sections are connected by screwing one into the other melted solder may be poured in through this hole or opening to fill the circular indentation $a'$, and to add to the security of the joint.

I have represented in Fig. 2 a band, B, which is applied to the exterior of the joint after the joint is otherwise complete, or after the two sections have been connected by screwing one into the other. The interior surface of this band B may be tinned or coated with fusible metal or alloy, and it may be heated sufficiently to produce the expansion which will enable it to be slipped upon the exterior of the cylindric section A'. This may be done before the cylindric sections are heated to sweat-solder them together. By the same heating operation the band B may be sweat-soldered to the exterior of the joint.

The joint thus produced will be inexpensive, and will have great security, because the sweating of the two cylindric sections together, the filling of the circular indentation with solder, and the application of the band B to the joint all aid in producing a firm union of the two cylindric sections.

What I claim as my invention, and desire to secure by Letters Patent, is—

1. The combination, with a female cylinder or cylindric section having an internal screw-thread and a circular outward indentation behind the screw-thread, of a male cylinder or cylindric section having an external screw-thread at a little distance from its end, whereby it is connected with the female cylinder or cylindric section, and caused to lap across and extend beyond the circular indentation therein, and a solder filling for the circular indentation, whereby the two sections are firmly connected together, substantially as herein described.

2. The combination, with a female cylinder having an internal screw-thread and a circular outward indentation behind the screw-thread, of a male cylinder screwed into the female cylinder and lapping over and extending across the circular indentation therein, the two cylinders being sweated together at their contact-surfaces, and a filling of solder in the circular indentation, substantially as herein described.

3. The combination, with a female cylinder or cylindric section having an internal screw-thread and a circular outward indentation behind the screw-thread, of a male cylinder or cylindric section having an external screw-thread at a little distance from the end, whereby it is connected with the female cylinder or section and caused to lap across and extend beyond the circular indentation therein, a solder filling for the circular indentation, and an external band lapping upon and sweated to the two cylinders or sections at the joint, the solder filling and the external band serving to firmly connect the cylinders or cylindric sections together, substantially as herein described.

WM. HENRY BROWN.

Witnesses:
C. HALL,
FREDK. HAYNES.